United States Patent

[11] 3,593,178

[72] Inventor Masayoshi Tanaka
Tokyo, Japan

[21] Appl. No. 792,634
[22] Filed Jan. 21, 1969
[45] Patented July 13, 1971
[73] Assignee Honeywell Inc.
Minneapolis, Minn.
[32] Priority Jan. 19, 1968
[33] Japan
[31] 43/2607

[54] INPUT SWITCHING CIRCUIT
3 Claims, 3 Drawing Figs.

[52] U.S. Cl. .......... 330/185, 330/51, 330/69, 307/242, 307/259, 328/96
[51] Int. Cl. .......... H03f 1/00
[50] Field of Search .......... 330/51, 67; 307/242, 243, 253, 259; 328/96, 97

[56] References Cited

UNITED STATES PATENTS

| | | | |
|---|---|---|---|
| 2,941,095 | 6/1960 | Miranda | 307/242 |
| 3,135,873 | 6/1964 | Werme | 307/243 X |
| 3,379,898 | 4/1968 | Adler et al. | 307/243 X |

*Primary Examiner*—Nathan Kaufman
*Attorneys*—Arthur H. Swanson and Lockwood D. Burton

ABSTRACT: A single signal current is selected from a plurality of DC signal currents of varied levels and is transmitted to means for performing measurement, operation and signal conversion.

INVENTOR
MASAYOSHI TANAKA
BY
Lockwood D. Burton
ATTORNEY

INPUT SWITCHING CIRCUIT

The present invention relates to an input switching circuit in which one signal current is selected from a plurality of DC signal currents of varied levels such as, for example, 4—20 maDC or 10—50 maDC and transmitted to means for performing measurement, operation and signal conversion.

FIG. 1 shows an embodiment of this type of conventional input switching circuit wherein the series circuits comprising signal current sources ($I_1$, $I_2$, ... $I_n$) and current-voltage converting precision resistors ($R_1$, $R_2$, ... $R_n$) are provided one pair for each channel, all of these series circuits being connected between a positive current feed line $l_1$ and a common line $l_2$ of zero potential, and the junction point between each current source and the corresponding resistor is connected through a corresponding changeover switch ($S_1$, $S_2$, ...$S_n$) to an end of the input terminal of a measuring amplifier $A_1$ composed of a DC amplifier having a high input impedance, whereby an output voltage $e_o$ corresponding to the signal current of the selected channel is obtained at the output terminal adapted to feedback it to the other input terminal. $l_3$ is a negative current feed line and $l_4$ and $l_5$ are respectively, current feed lines for the measuring amplifier $A_1$.

For the changeover switches $S_1$, $S_2$ ... $S_n$ used in the circuit of FIG. 1, semiconductor switches can not be employed due to the nature of the circuit structure, so that usually used are lead switches whose opening and closing operation is controlled by a changeover switch actuator electrically insulated from the measuring amplifier. This is directly responsible for the fact that such conventional input switching circuits can hardly meet the demand for high-speed switching required in the recent advanced electronical appliances. Further, in the conventional circuit of FIG. 1, the signal current is once converted into a voltage signal corresponding to the amplitude of the current and the converted voltage signal is selected by a changeover switch and then impressed to the measuring amplifier, so that at least one precision resistor is required for each channel to effect such conversion, resulting in a costly apparatus.

SUMMARY OF THE INVENTION

The input switching circuit according to the present invention comprises channels each including a signal current source and a normally closed transistor as a changeover switch inserted between the output terminal and the common line, a feedback resistor connected between an end of the input terminal and the output terminal, a high-gain measuring amplifier having its other input terminal connected to the common line, and diodes each being inserted and connected between one input terminal of the amplifier and the output terminal of the signal current source of each channel so that each diode will be orientated in the forward direction with respect to the signal current. By utilizing the level of the signal current and the characteristic of the transistors and diodes at this level, particularly the fact that the collector-emitter voltage at the time of saturation of the transistors is far smaller than the voltage required to pass the current through the forwardly directed diodes, the diodes inserted in the forward direction with respect to the signal current are actuated to function as diode switches which turn the corresponding transistors into an open position when they are in a conducting or closed position and into a closed position when they are in a nonconducting or open position, thus realizing an input switching circuit of purely electronical system.

It is therefore an object of the present invention to provide a novel input switching circuit which does not require a plurality of precision resistors for converting current into voltage.

It is another object of the present invention to provide a high-speed and long-durable input switching circuit using semiconductor switches for the changeover operation.

DESCRIPTION OF THE PREFERRED EMBODIMENT

Figure 2:
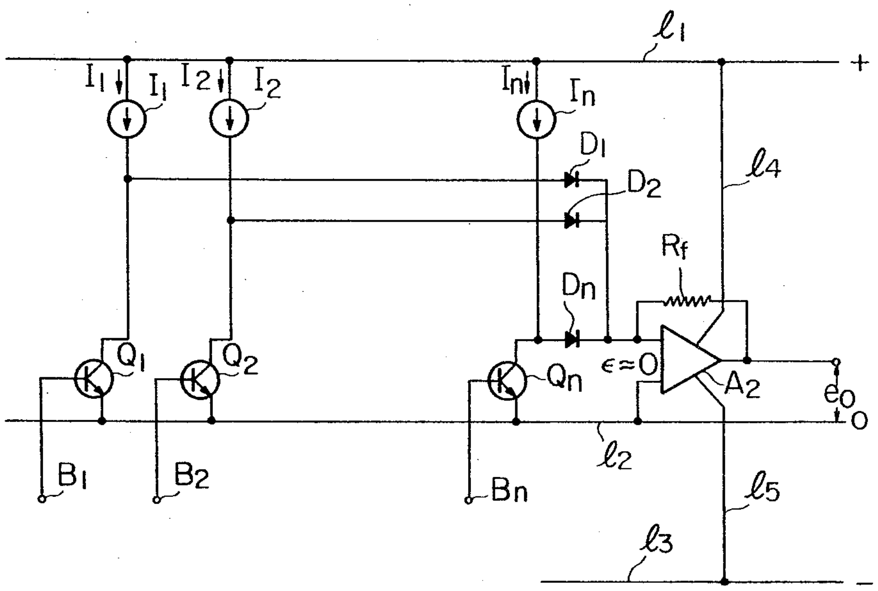
FIG. 2 is a block diagram showing an embodiment of the input switching circuit according to the present invention.

The invention of subject application will be described in more detail with reference to FIG. 2, which illustrates a preferred embodiment of the present invention. Reference signs $I_1$, $I_2$ ... $I_n$ denote a plurality (*n* pieces) of signal current sources, $Q_1$, $Q_2$, ... $Q_n$ NPN transistors adopted in this embodiment as semiconductor switches, $D_1$, $D_2$, ... $D_n$ diodes which cooperate with the transistors to ensure the selecting operation, $A_2$ a measuring amplifier comprising a high-gain DC amplifier to which an operating voltage is supplied from both positive and negative current feed lines $l_1$ and $l_3$ through lines $l_4$ and $l_5$, respectively, and $R_f$ a feedback resistor connected between an input terminal of the amplifier $A_2$ and the output terminal thereof. The other input terminal of the amplifier $A_2$ is directly connected to common line $l_2$ of zero potential.

Each channel has its emitter connected to the common line $l_2$ and includes a transistor as a changeover switch having its base connected to a changeover switch actuator (not shown) and a signal current source connected between a collector of the transistor and the positive current feed line $l_1$. One input terminal of the measuring amplifier $A_2$ is connected to the junction point between the signal current source and the transistor switch of each channel through each one of corresponding diodes which is inserted in the forward direction with respect to the signal current.

The transistors $Q_1$, $Q_2$ ... $Q_n$ as the selective changeover switches are connected in the circuit in the manner described and are also normally biased to a closed position by the changeover switch actuators not shown. Therefore, the selective operation is accomplished by rendering the transistor of a particular channel to be selected into an open position.

In other words, when the selective operation is in repose, each signal current flows from the collector of the normally closed transistor through the emitter, and no current is permitted to flow into the measuring amplifier $A_2$ through the corresponding diode. This is because the diodes $D_1$, $D_2$, ... $D_n$ are nonlinear elements such as silicon diodes which require a voltage $V_D$ of about 0.6 v. for conducting the current therethrough, while the collector-emitter voltage $V_{CE}$(sat) at saturation of the transistor is sufficiently small as compared with the voltage $V_D$, so that the diode, even if inserted in the forward direction, does not permit passage of any current therethrough.

When the changeover switch actuator is operated to open the transistor $Q_k$ of a particular channel K, the signal current $I_k$ of this channel flows through the corresponding diode $D_k$ in the forward direction to the measuring amplifier $A_2$ and thence through the feedback resistor $R_f$ to the output terminal, where an output voltage $e_o$ of an amount of $I_kR_f$ is generated. In this case, the signal current $I_k$ flowing through the diode $D_k$ is inhibited from flowing into the other channels by the presence of diodes provided one each for such channels.

In this case, the loaded circuit of the diodes $D_1$—$D_n$ needn't necessarily be kept at almost zero as shown in the figure, but it is advantageous to do so for facilitating high speed switching operation.

Figure 1:
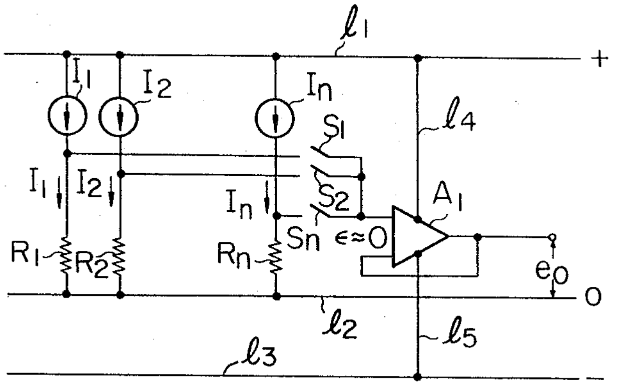
FIG. 1 is a block diagram showing an embodiment of conventional input switching circuits.
Figure 3:
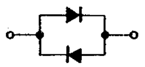
FIG. 3 is a view of a diode circuitry used in another embodiment of the present invention.

In case the input in the changeover switch circuitry is bidirectional, nonlinear elements such as shown in FIG. 3 may be used to attain the object. It is preferable in this case to jointly use both PNP-type and NPN-type for transistor switches. Such circuit may be used, for example, for sampling of deviation.

Although in this embodiment the measuring amplifier has an end of its input terminal directly connected to the common line, it is also possible within the scope of the invention to make such connection through a suitable bias voltage if need be.

I claim:

1. A current signal switching circuit comprising, in combination:

an amplifier having an input circuit, an output circuit, and a feedback circuit interconnecting said output circuit and said input circuit, a plurality of input signal current means, selectively controllable gate means connected between each of said input signal means and a point of fixed reference potential, said selectively controllable gate means comprising the sole impedance means between said plurality of input current signal current means, respectively, and said point of fixed reference potential, voltage responsive gating means connected between each of said input signal means and said input circuit of said amplifier, said voltage responsive gating means comprising the sole impedance means between said plurality of input signal current means, respectively, and said input circuit of said amplifier, said voltage responsive gating means being operative in response to the actuation of corresponding ones of said selectively controllable gate means, and means for selectively operating said controllable gate means whereby to selectively apply current signals from said input signal means to said input circuit of said amplifier through said voltage responsive gate means.

2. The invention as set forth in claim 1 wherein said selectively controllable gate means comprise transistors.

3. The invention as set forth in claim 1 wherein said voltage responsive gate means comprise diodes which are effective to block the passage of signals to said input circuit whenever said controllable gate means are actuated to connect the associated signal means to said point of fixed reference potential.